(12) United States Patent
Wang et al.

(10) Patent No.: US 10,372,234 B2
(45) Date of Patent: Aug. 6, 2019

(54) CALCULATING A SOCIAL ZONE DISTANCE

(71) Applicant: LENOVO (Singapore) PTE. LTD., New Tech Park (SG)

(72) Inventors: Song Wang, Cary, NC (US); Jian Li, Chapel Hill, NC (US); John Weldon Nicholson, Cary, NC (US); Ming Qian, Cary, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 148 days.

(21) Appl. No.: 15/590,825

(22) Filed: May 9, 2017

(65) Prior Publication Data

US 2018/0330168 A1 Nov. 15, 2018

(51) Int. Cl.
| | |
|---|---|
| *G06F 3/03* | (2006.01) |
| *G06Q 50/00* | (2012.01) |
| *G10K 11/178* | (2006.01) |
| *H04B 1/20* | (2006.01) |
| *H04R 3/12* | (2006.01) |
| *H04R 5/02* | (2006.01) |
| *H04R 5/04* | (2006.01) |

(Continued)

(52) U.S. Cl.
CPC .......... *G06F 3/0304* (2013.01); *G06F 1/3231* (2013.01); *G06F 3/011* (2013.01); *G06F 3/16* (2013.01); *G06Q 50/01* (2013.01); *G10K 11/178* (2013.01); *H04B 1/20* (2013.01); *H04B 1/202* (2013.01); *H04R 3/12* (2013.01); *H04R 5/02* (2013.01); *H04R 5/04* (2013.01); *G10K 2210/1081* (2013.01); *G10K 2210/3056* (2013.01); *G10K 2210/30391* (2013.01); *G10K 2210/3214* (2013.01); *G10K 2210/503* (2013.01); *H04R 1/345* (2013.01); *H04R 1/403* (2013.01); *H04R 2203/12* (2013.01); *H04R 2205/022* (2013.01)

(58) Field of Classification Search
CPC .......... G06K 9/00677; G06K 9/00221; G06K 9/00664; G06K 9/00778; G06Q 50/01; G06Q 10/105; G06F 17/3053; G06F 17/30699; G06F 17/30867; G06F 3/017; G06F 3/0304; G06T 2207/10004; G06T 2207/10016; G06T 2207/30196; G01J 5/0025; G08B 21/22
See application file for complete search history.

(56) References Cited

U.S. PATENT DOCUMENTS 8,606,792 B1* 12/2013 Jackson ............ G06F 17/30699
707/748
2007/0124503 A1* 5/2007 Ramos .................... G06F 3/017
709/248

(Continued)

OTHER PUBLICATIONS

Marquart N. et al., "Informing the Design of Proxemic Interactions", IEEE Pervasive Computing 11.2, Apr.-Jun. 2012, pp. 14-23.

(Continued)

*Primary Examiner* — Jingge Wu
(74) *Attorney, Agent, or Firm* — Kunzler Bean & Adamson

(57) ABSTRACT

For calculating a social zone distance, a processor determines distances to one or more persons using the sensor array. In addition, the processor calculates the social zone distance based on the distances.

19 Claims, 10 Drawing Sheets

(51) Int. Cl.
*G06F 3/16* (2006.01)
*G06F 1/3231* (2019.01)
*G06F 3/01* (2006.01)
*H04R 1/34* (2006.01)
*H04R 1/40* (2006.01)

(56) References Cited

U.S. PATENT DOCUMENTS

| | | | | |
|---|---|---|---|---|
| 2007/0163364 | A1* | 7/2007 | Haridas | G01H 11/08 |
| | | | | 73/862 |
| 2011/0125850 | A1* | 5/2011 | Rahnama | H04W 4/21 |
| | | | | 709/205 |
| 2011/0167115 | A1* | 7/2011 | Gilbert | G06Q 10/00 |
| | | | | 709/204 |
| 2013/0156274 | A1* | 6/2013 | Buchmueller | G06Q 10/101 |
| | | | | 382/118 |
| 2014/0079212 | A1* | 3/2014 | Sako | H04M 1/60 |
| | | | | 379/395 |
| 2014/0270363 | A1* | 9/2014 | Chakraborty | G06K 9/00248 |
| | | | | 382/103 |
| 2014/0270482 | A1* | 9/2014 | Chakraborty | G06K 9/00221 |
| | | | | 382/154 |
| 2014/0351377 | A1* | 11/2014 | Chen | H04W 4/02 |
| | | | | 709/217 |
| 2015/0012449 | A1* | 1/2015 | Jackson | H04L 67/02 |
| | | | | 705/319 |
| 2015/0039607 | A1* | 2/2015 | Lothian | G06F 17/3053 |
| | | | | 707/732 |
| 2015/0074197 | A1* | 3/2015 | Brown | H04W 4/21 |
| | | | | 709/204 |
| 2015/0117786 | A1* | 4/2015 | James | G06F 17/3028 |
| | | | | 382/195 |
| 2015/0172830 | A1* | 6/2015 | Liu | H04R 25/40 |
| | | | | 381/313 |
| 2015/0213002 | A1* | 7/2015 | Gou | G06F 17/2785 |
| | | | | 704/9 |
| 2015/0223731 | A1* | 8/2015 | Sahin | A61B 5/16 |
| | | | | 600/301 |
| 2016/0140672 | A1* | 5/2016 | Shnitzer | G06F 3/0482 |
| | | | | 715/753 |
| 2016/0203828 | A1* | 7/2016 | Gomez | G10L 15/20 |
| | | | | 704/226 |
| 2016/0247364 | A1 | 8/2016 | Herman et al. | |
| 2017/0076157 | A1* | 3/2017 | Vazquez | G06K 9/00778 |
| 2017/0329394 | A1* | 11/2017 | Goldstein | G06F 3/017 |
| 2018/0286387 | A1* | 10/2018 | Bender | G10L 15/075 |

OTHER PUBLICATIONS

Mead R. et al., "Perceptual Models of Human-Robot Proxemics", Experimental Roboitcs, Springer 2016, pp. 1-15.

* cited by examiner

200

205

CALCULATING A SOCIAL ZONE DISTANCE

BACKGROUND

Field

The subject matter disclosed herein relates to social distances and more particularly relates to calculating a social zone distance.

Description of the Related Art

People often feel uncomfortable when a social distance is too close.

BRIEF SUMMARY

An apparatus for calculating a social zone distance is disclosed. The apparatus includes a sensor array, a processor, and a memory that stores code. The processor may execute the code to determine distances to one or more persons using the sensor array. In addition, the processor may calculate the social zone distance based on the distances. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
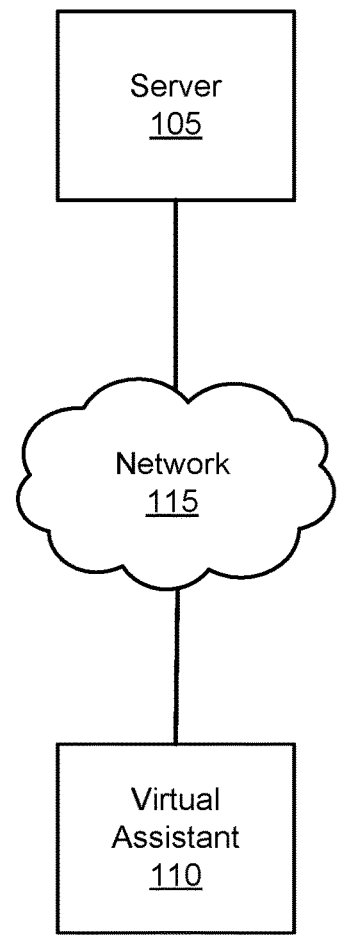
FIG. 1A is a schematic block diagram illustrating one embodiment of a virtual assistant system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a virtual assistant system 100. The system 100 may calculate a social zone distance based on distances and/or other information. In the depicted embodiment, the system 100 includes a server 105, a virtual assistant 110, and a network 115.

The server 105 may be in communication with the virtual assistant 110 through the network 115. The network 115 may be the Internet, a wide-area network, a local area network, a mobile telephone network, a Wi-Fi network, or combinations thereof. The virtual assistant 110 may respond to commands from a user.

The user may react to the virtual assistant 110 using human social conventions. For example, the user may move closer to the virtual assistant 110 for confidential inquiries and/or commands. The embodiments described herein determine distances to one or more persons from the virtual assistant 110 and calculate a social zone distance based on the distances. In addition, the embodiments may take appropriate actions based on the social zone distances as will be described hereafter. The social zone distances may be shared with one or more persons.

Figure 1B:
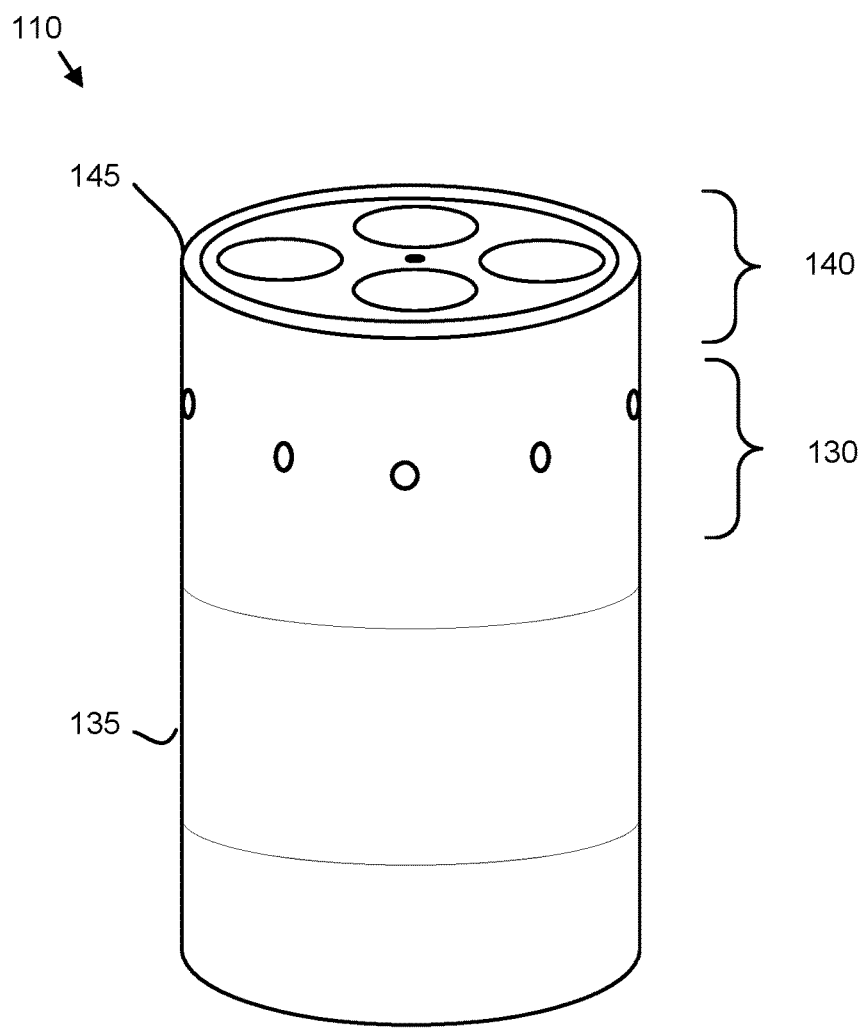
FIG. 1B is a perspective drawing illustrating one embodiment of a virtual assistant.

FIG. 1B is a perspective drawing illustrating one embodiment of the virtual assistant 110. In the depicted embodiment, the virtual assistant 110 includes a sensor array 130, speakers 135, controls 140, and a microphone array 145. The virtual assistant 110 may receive commands with the microphone array 145 and respond to the commands through the speakers 135. In one embodiment, the virtual assistant 110 calculates the responses internally. Alternatively, the virtual assistant 110 may communicate the commands to the server 105 and respond to the commands based on calculations performed at the server 105. The controls 140 may allow the user to manually control aspects of the virtual assistant 110.

The sensor array 130 may sense a distance to one or more persons. In one embodiment, the sensor array 130 comprises thermal sensors. The sensor array 130 may determine a distance to the one or more persons based on a heat signature. In addition, the sensor array 130 may include cameras. The sensor array may determine the distance to the one or more persons based on a size of the person within the image, triangulation between cameras to the person, or combinations thereof.

Figure 2:
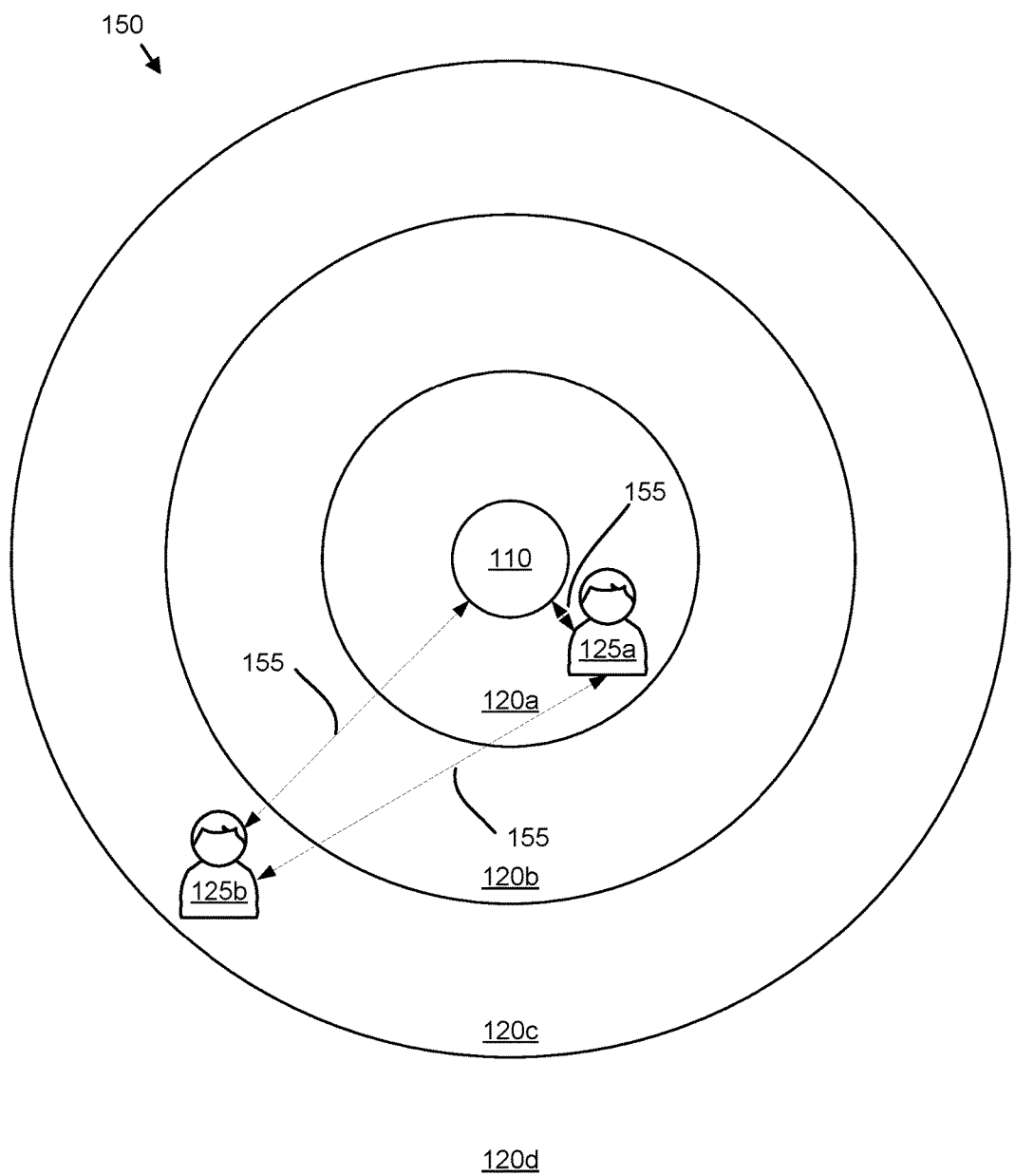
FIG. 2 is a schematic diagram illustrating one embodiment of social zone distances.

FIG. 2 is a top view schematic diagram illustrating one embodiment of social zone distances 120. The virtual assistant 110 is depicted at a center of the social zone distances 120. Alternatively, a person 125 may be at the center of the social zone distances 120. The social zone distances 120 may include an intimate distance social zone distance (hereinafter intimate distance) 120a, a personal distance social zone distance (hereinafter personal distance) 120b, a social distance social zone distance (hereinafter social distance) 120c, and a public speaking distance social zone distance (hereinafter public speaking distance) 120d. Persons 125a-b may be disposed within the social zone distances 120 at various distances to the virtual assistant 110. The virtual assistant 110 may determine the distances 155 to each of the persons 125a-b from the virtual assistant 110 In addition, the virtual assistant 110 may determine distances 155 between the persons 125a-b.

Figure 3A:
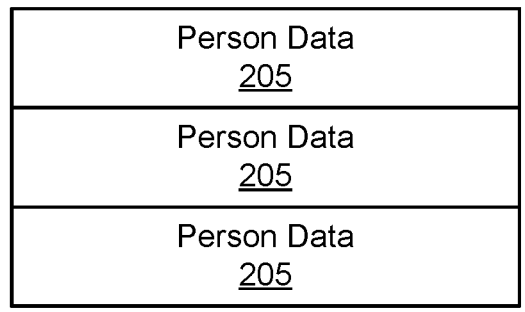
FIG. 3A is a schematic block diagram illustrating one embodiment of a person database.

FIG. 3A is a schematic block diagram illustrating one embodiment of a person database 200. The person database 200 may store information about one or more persons 125 that interact with the virtual assistant 110 and/or are near to the virtual assistant 110. The person database 200 may be organized as a data structure in a memory. In the depicted embodiment, the person database 200 includes person data 205 for one or more persons 125.

Figure 3B:
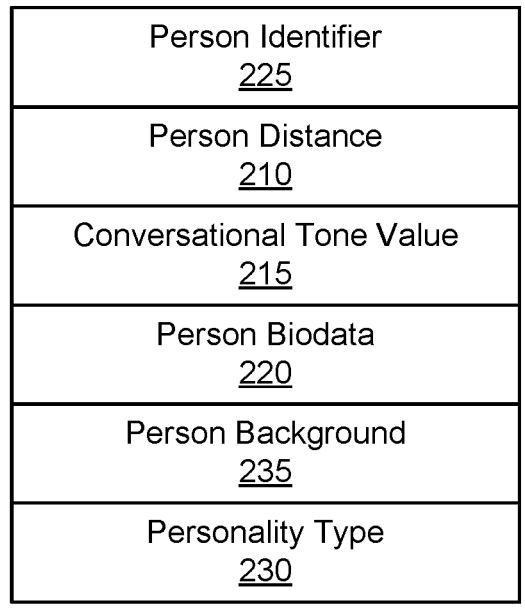
FIG. 3B is a schematic block diagram illustrating one embodiment of person data.

FIG. 3B is a schematic block diagram illustrating one embodiment of the person data 205. The person data 205 may store information for a single person 125 that interacts with the virtual assistant 110 and/or is near the virtual assistant 110. In the depicted embodiment, the person data 205 includes a person identifier 225, a person distance 210, a conversational tone value 215, a person biodata 220, a person background 235, and a personality type 230.

The person identifier 225 may uniquely identify a person 125. The person identifier 225 may include a name and/or contact information. In addition, the person identifier 225 may include an index number.

The person distance 210 may include a distance 155 to the person 125. In addition, the person distance 210 may include a vector to the person 125. The vector may be used to calculate distances 155 between persons 125.

The person biodata 220 may store an image of the person 125. In addition, the person biodata 220 may store a heat signature of the person 125. The person biodata 220 may also include a voice print of the person 125.

The person background 235 may record one or more of a nationality, a gender, an age, and a cultural trait of the person 125. The person background 235 may be reported to the virtual assistant 110 and/or the server 105 by the person 125. In addition, the person background 235 may be downloaded by the server 105 and/or virtual assistant 110 from one or more public sources, social media sites, and the like.

In one embodiment, the personality type 230 identifies the person 125 as an introvert person, an extrovert person, or a stranger. The personality type 230 may be reported by a user. Alternatively, the personality type 230 may be identified from mannerisms of the person 125 by the virtual assistant 110 and/or server 105.

Figure 4A:
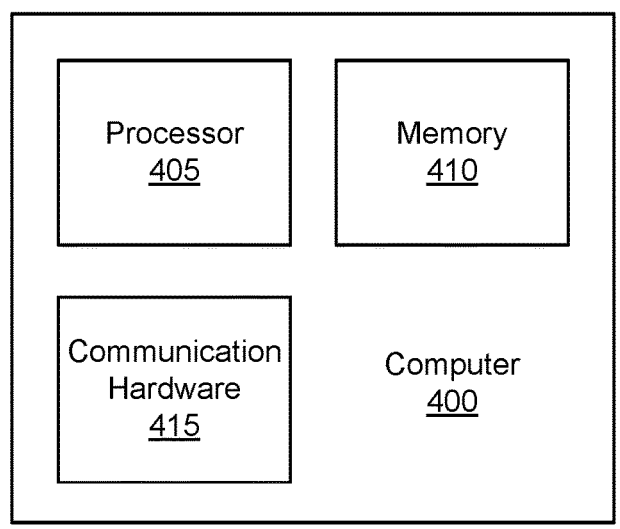
FIG. 4A is a schematic block diagram illustrating one embodiment of a computer.

FIG. 4A is a schematic block diagram illustrating one embodiment of a computer 400. The computer 400 may be embodied in the virtual assistant 110, the server 105, or combinations thereof. In the depicted embodiment, the computer 400 includes a processor 405, a memory 410, and communication hardware 415. The memory 410 may include a semiconductor storage device, hard disk drive, an optical storage device, a micromechanical storage device, or combinations thereof. The memory 410 may store code. The processor 405 may execute the code. The communication hardware 415 may communicate with other devices and/or the network 115.

Figure 4B:
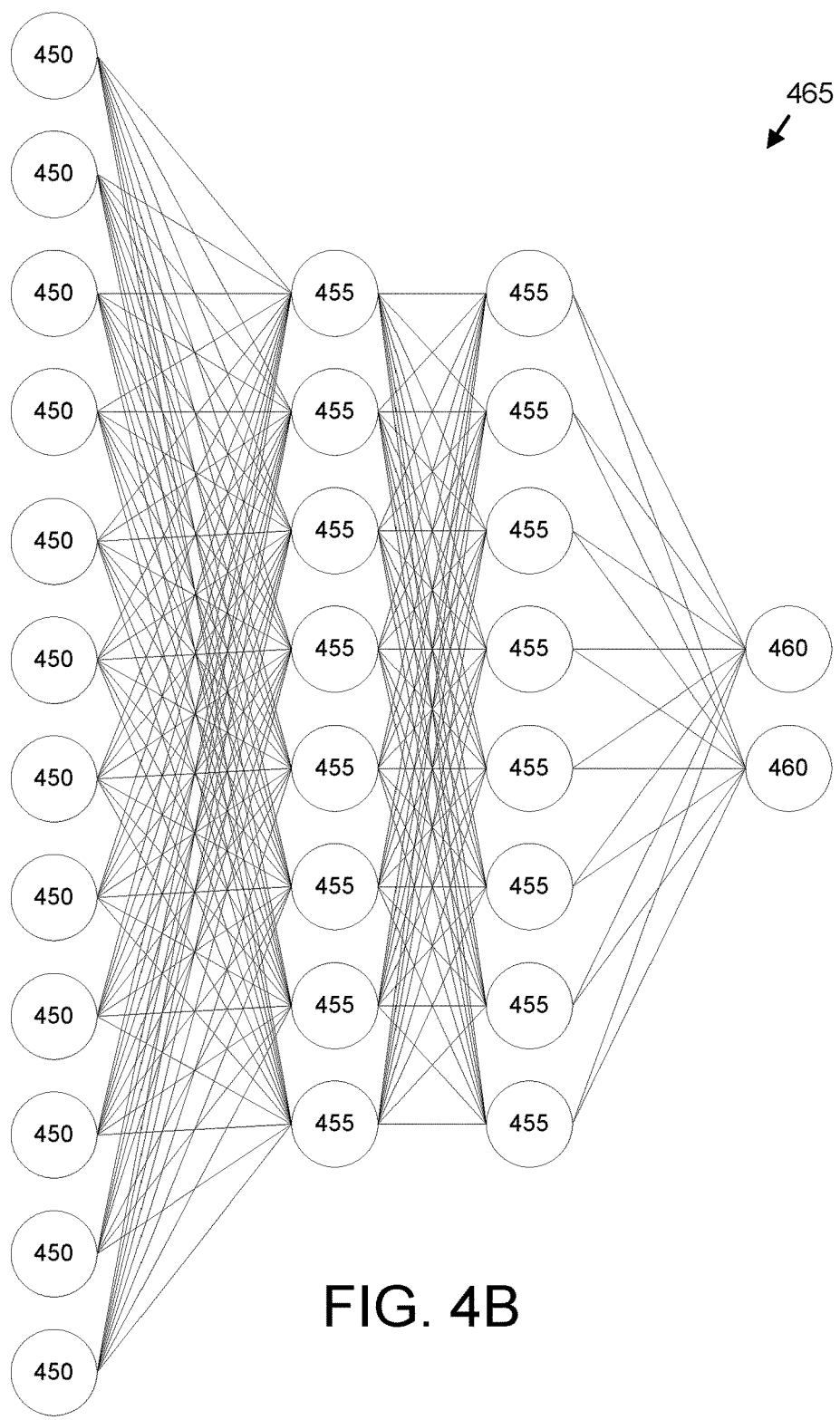
FIG. 4B is a schematic block diagram illustrating one embodiment of a neural network.

FIG. 4B is a schematic block diagram illustrating one embodiment of a neural network 465. In the depicted embodiment, the neural network 465 includes input neurons 450, hidden neurons 455, and output neurons 460. The neural network 465 may be trained with training data. The training data may include data from the sensory inputs 130 and/or microphone array 145. In addition, the training data may include the person data 205 for one or more persons 125.

The neural network 465 may be trained using one or more learning functions while applying the training data to the input neurons 450 and specifying known result values for the output neurons 460. Subsequently, the neural network 465 may receive actual data at the input neurons 450 and make predictions at the output neurons 460 based on the actual data. The actual data may include data from the sensory inputs 130 and/or the microphone array 145.

Figure 5A:
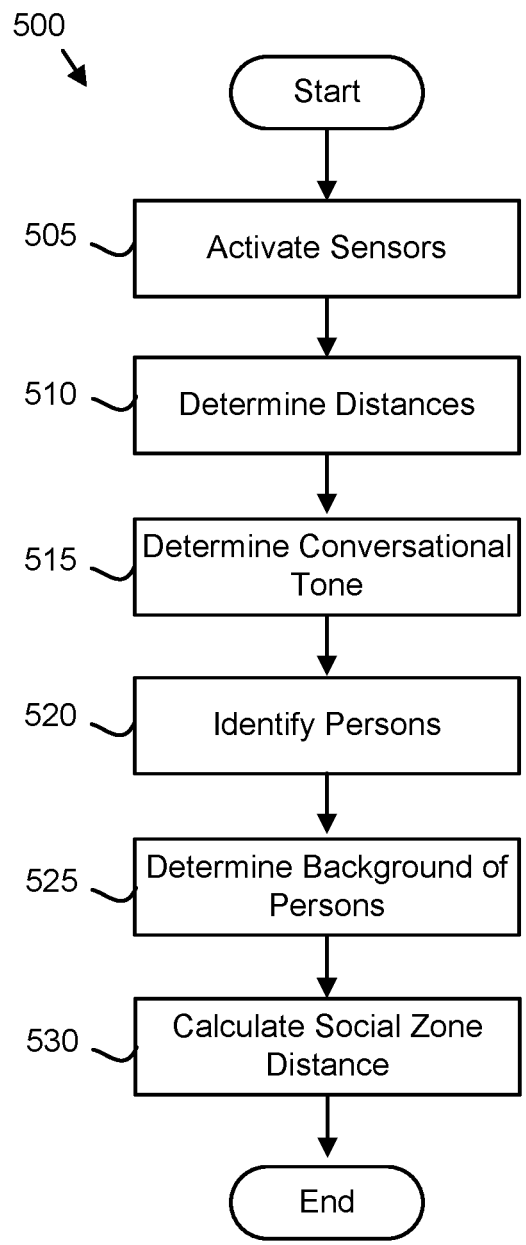
FIG. 5A is a schematic flow chart diagram illustrating one embodiment of a social distance calculation method.

FIG. 5A is a schematic flow chart diagram illustrating one embodiment of a social distance calculation method 500. The method 500 may calculate a social zone distance 120. The method 500 may be performed by the virtual assistant 110, the server 105, or combinations thereof. In addition, the method 500 may be performed by the processor 405.

The method 500 starts, and in one embodiment, the processor 405 activates 505 the sensor array 130. The processor 405 may activate 505 thermal sensors in the sensor array 130. The thermal sensors may capture a heat signature of one or more persons 125. In addition, the processor 405 may activate 505 one or more optical sensors to capture an image of the one or more persons 125.

The processor 405 may determine 510 distances to the one or more persons 125 using the sensor array 130. In one embodiment, the processor 405 determines 510 the distances as a function of a heat signature. For example, the distance d may be calculated using Equation 1, where HS is a heat signature array.

$$d = k\sqrt{HS} \qquad \text{Equation 1}$$

The distance d may be stored as the person distance 210.

In one embodiment, the processor 405 determines 510 the distances using triangulation between the one or more optical sensors. In a certain embodiment, the processor 405 determines 510 the distances as a function of an apparent size of the person 125 as captured by a camera and/or thermal sensor relative to an image and/or heat signature stored in the person biodata 220.

In one embodiment, the processor 405 determines 515 a conversational tone for the one or more persons 125. The conversational tone CT may be calculated using Equation 2, where V is a volume amplitude of a command to the virtual assistant 110.

$$CT=V/d^2 \qquad \text{Equation 2}$$

The conversational tone may be stored as the conversational tone value 215.

The processor 405 may identify 520 the one or more persons 125. The processor 405 may identify 520 the one or more persons using voice recognition. The processor 405 may compare a command to the virtual assistant 110 with the voice print from the person biodata 220. In addition, the processor 405 may identify 520 the one or more persons 125 using facial recognition. For example, the processor 405 may compare the captured image with the images stored in the person biodata 220 to identify 520 a person 125.

In one embodiment, the processor 405 determines 525 a background of the one or more persons 125. The background may be retrieved from the person background 235. In addition, the background may be determined 525 by scraping information from one or more search engine results, social media sites, and the like. The background may be stored to the person background 235.

The processor 405 may calculate 530 the social zone distance 120 and the method 500 ends. In one embodiment, the social zone distance 120 is calculated using Table 1, where the distance ranges of the table represent a range from a minimum appropriate social zone distance 120 for a social relationship to a maximum social zone distance 120 for the social relationship. Thus, the social zone distance 120 may be determined from the range corresponding to the distance 155 and/or the personality type 230.

TABLE 1

|  | Introvert Person | Extrovert person | stranger |
|---|---|---|---|
| Intimate distance | 0.4-1.5 m | 0.3-0.5 m | ≤0.5 m |
| Personal distance | 1.5-2 m | 0.4-1.5 m | 0.5-1.5 m |
| Social distance | 2-4 m | 1.5-3 m | 1.5-3 m |
| Public speaking distance | >4 m | >3 m | >3 m |

In one embodiment, the social zone distance 120 is calculated as a function of the distances 155 and one or more of a nationality, a gender, an age, and a cultural trait of the one or more persons 125. For example, the neural network 465 may be trained with the distances 155 and one or more of the nationality, gender, age, cultural trait from the person background 235 for the one or more persons 125. In a certain embodiment, the social zone distance 120 is calculated as a function of the conversation tone. The neural network 465 may be trained with the conversational tone values 215 and person distances 210.

Figure 5B:
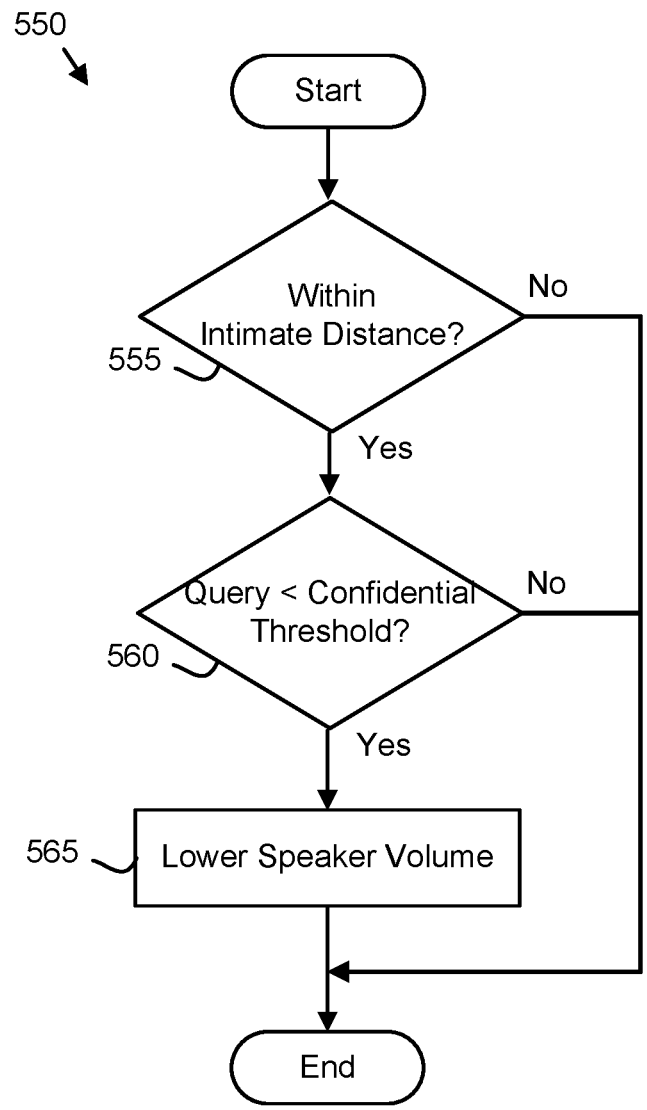
FIG. 5B is a schematic flow chart diagram illustrating one embodiment of a speaker volume adjustment method.

FIG. 5B is a schematic flow chart diagram illustrating one embodiment of a speaker volume adjustment method 550. The method 550 may lower a speaker volume of the speakers 135. The method 550 may be performed by the virtual assistant 110, the server 105, or combinations thereof. In addition, the method 550 may be performed by the processor 405.

The method 550 starts, and in one embodiment, the processor 405 determines 555 if the first person 125a is within the intimate distance social zone distance 120a. If the first person 125a is not within the intimate distance 120a, the method 550 ends.

If the first person 125a is within the intimate distance 120a, the processor 405 determines 560 if a query and/or command from the first person 125a has a volume that is less than a confidential threshold. If the volume is not less than the confidential threshold, the method 550 ends. If the volume is less than the confidential threshold, the processor 405 may lower 565 the speaker volume for an audible response to the first person 125a and the method 550 ends. As a result, the virtual assistant 110 may respond to a confidential query in a similar confidential manner.

Figure 5C:
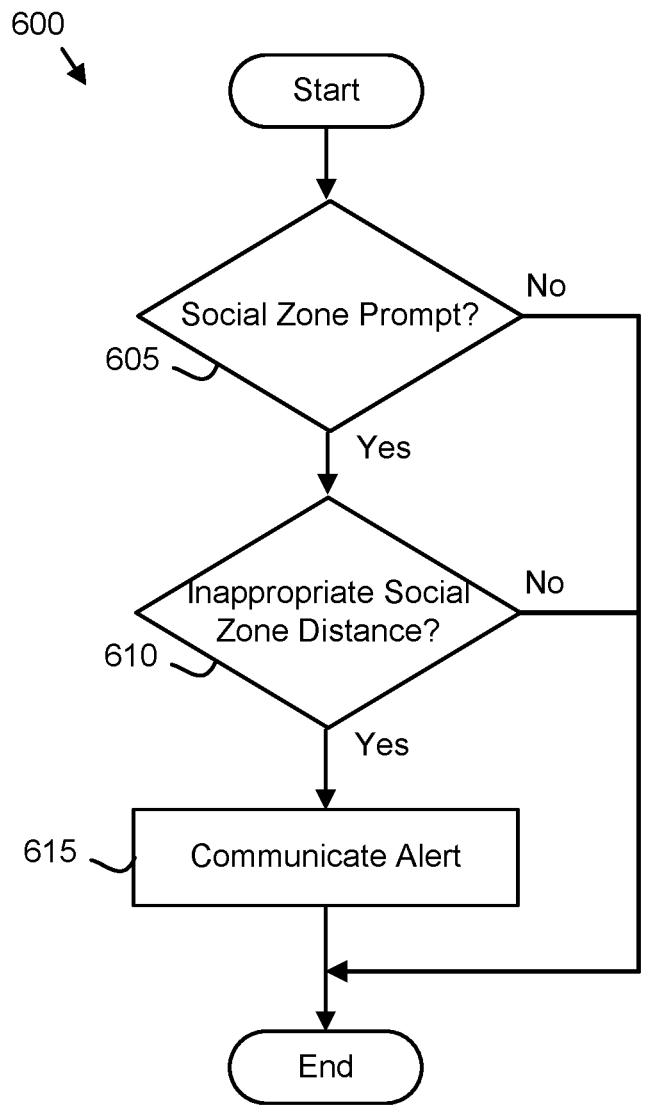
FIG. 5C is a schematic flow chart diagram illustrating one embodiment of an alert communication method.

FIG. 5C is a schematic flow chart diagram illustrating one embodiment of an alert communication method 600. The method 600 may communicate an alert in response to determining an inappropriate social distance. The method 600 may be performed by the virtual assistant 110, the server 105, or combinations thereof. In addition, the method 600 may be performed by the processor 405.

The method 600 starts, and in one embodiment, the processor 405 determines 605 if the user has requested a social zone prompt. If the user has not requested the social zone prompt, the method 600 ends. The user may be a first person 125a.

If the user has requested the social zone prompt, the processor 405 determines 610 if the distance 155 between the user and a second person 125b is an inappropriate social distance. In one embodiment, the processor 405 calculates the social zone distances 120 for the second person 125b. The calculation may be performed as described in FIG. 5A. The processor 405 may further calculate the distance 155 from the user to the second person 125b. The processor 405 may determine 610 the inappropriate social distance if the distance 155 is less than a minimum appropriate social zone distance, such as the minimum appropriate social zone distances of Table 1. If the processor 405 does not determine 610 an inappropriate social distance, the method 600 ends.

If the processor 405 determines 610 the inappropriate social distance, the processor 405 may communicate 615 an alert to the user and the method 600 ends. The alert may warn of the inappropriate social distance. In one embodiment, the alert suggests the minimum appropriate social zone distance. As a result, the user is informed of the minimum appropriate social zone distance for conversing with the second person 125b.

Figure 5D:
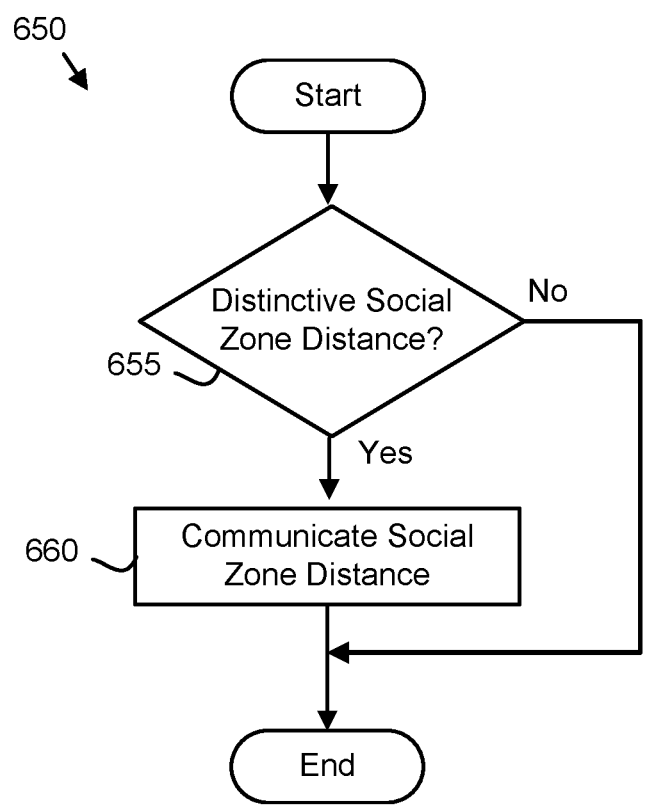
FIG. 5D is a schematic flow chart diagram illustrating one embodiment of a social distance communication method.

FIG. 5D is a schematic flow chart diagram illustrating one embodiment of a social distance communication method 650. The method 650 may communicate a social zone distance 120. The method 650 may be performed by the virtual assistant 110, the server 105, or combinations thereof. In addition, the method 650 may be performed by the processor 405.

The method 650 starts, and in one embodiment, the processor 405 detects 655 a distinctive social zone distance 120. In one embodiment, the distinctive social zone distance 120 is one of an intimate distance social zone distance 120a and a personal distance social zone distance 120b. If the distinctive social zone distance 120 is not detected, the method 650 ends.

If the distinctive social zone distance 120 is detected, the processor 405 communicates 660 the distinctive social zone distance 120 to the user and the method 650 ends. In one embodiment, the processor 660 communicates 660 the social zone distance 120 using a prearranged tone and/or musical series. As a result, the user is informed of the distinctive social zone distance 120 for conversing the second person 125*b*.

The embodiments determine the distances 155 to the one or more persons 125 using the sensor array 130. The embodiments further calculate a social zone distance 120 based on the distances 125. The social zone distance 120 may be used to modify communications from the virtual assistant 110 to one or more persons 125. As a result, communications with the virtual assistant 110 more closely approximate familiar human interactions.

In addition, the social zone distance 120 may be used to alert and/or inform a person of an inappropriate social distance and/or a distinctive social zone distance 120. As a result, a user may be better informed of appropriate social zone distances in a variety of social situations.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
 a sensor array;
 a processor;
 a memory that stores code executable by the processor to:
  determine distances to one or more persons using the sensor array;
  calculate a social zone distance based on the distances and nationalities of the one or more persons; and
  lower a speaker volume for an audible response to a first person if the calculated distance to a first person is within an intimate distance social zone and if a query from the first person has a volume that is less than a confidential threshold.

2. The apparatus of claim 1, wherein the code is further executable by the processor to identify the one or more persons.

3. The apparatus of claim 2, wherein social zone distance is one of an intimate distance, a personal distance, a social distance, and a public speaking distance for one of an introvert person, an extrovert person, and a stranger.

4. The apparatus of claim 3, wherein the social zone distance is further calculated as a function of a gender, an age, and a cultural trait of the one or more persons.

5. The apparatus of claim 2, wherein the code is further executable by the processor to activate one or more optical sensors to capture an image of the one or more persons.

6. The apparatus of claim 2, wherein the one or more persons are identified using one or more of voice recognition and facial recognition.

7. The apparatus of claim 1, wherein the code is further executable by the processor to determine a conversation tone and wherein the social zone distance is further calculated as a function of the conversation tone.

8. The apparatus of claim 1, wherein the code is further executable by the processor to:
 determine an inappropriate social distance; and
 in response to determining the inappropriate social distance, communicate an alert.

9. The apparatus of claim 1, wherein the code is further executable by the processor to communicate the social zone distance in response to detecting a distinctive social zone distance.

10. A method comprising:
 determining, by use of a processor, distances to one or more persons;
 calculating a social zone distance based on the distances and nationalities of the one or more persons;
 lowering a speaker volume for an audible response to a first person if the calculated distance to a first person is within an intimate distance social zone and if a query from the first person has a volume that is less than a confidential threshold.

11. The method of claim 10, the method further comprising identifying the one or more persons.

12. The method of claim 11, wherein social zone distance is one of an intimate distance, a personal distance, a social distance, and a public speaking distance for one of an introvert person, an extrovert person, and a stranger.

13. The method of claim 12, wherein the social zone distance is further calculated as a function of a gender, an age, and a cultural trait of the one or more persons.

14. The method of claim 11, the method further comprising activating one or more optical sensors to capture an image of the one or more persons.

15. A program product comprising a non-transitory computer readable storage medium that stores code executable by a processor to perform:
 determining distances to one or more persons;
 calculating a social zone distance based on the distances one and nationalities of the one or more persons; and
 lowering a speaker volume for an audible response to a first person if the calculated distance to a first person is within an intimate distance social zone and if a query from the first person has a volume that is less than a confidential threshold.

16. The program product of claim 15, the processor further identifying the one or more persons.

17. The program product of claim 16, wherein social zone distance is one of an intimate distance, a personal distance, a social distance, and a public speaking distance for one of an introvert person, an extrovert person, and a stranger.

18. The program product of claim 17, wherein the social zone distance is further calculated as a function of a gender, an age, and a cultural trait of the one or more persons.

19. The program product of claim 15, the processor further activating one or more optical sensors to capture an image of the one or more persons.

* * * * *